(12) United States Patent
Yu et al.

(10) Patent No.: US 11,748,915 B2
(45) Date of Patent: Sep. 5, 2023

(54) VR IMAGE COMPRESSION TRANSMISSION METHOD AND SYSTEM

(71) Applicant: QINGDAO PICO TECHNOLOGY CO., LTD., Shandong (CN)

(72) Inventors: Dongzhuang Yu, Shandong (CN); Xinyu Cui, Shandong (CN); Jian Wu, Shandong (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 17/886,063

(22) Filed: Aug. 11, 2022

(65) Prior Publication Data

US 2022/0405976 A1 Dec. 22, 2022

Related U.S. Application Data

(63) Continuation of application No. PCT/CN2021/121005, filed on Sep. 27, 2021.

(30) Foreign Application Priority Data

Jun. 22, 2021 (CN) ......................... 202110692510.X

(51) Int. Cl.
*G06K 9/36* (2006.01)
*G06T 9/00* (2006.01)
(Continued)

(52) U.S. Cl.
CPC ................. *G06T 9/00* (2013.01); *G06T 3/40* (2013.01); *G06T 7/12* (2017.01); *G06T 15/005* (2013.01)

(58) Field of Classification Search
CPC .. G06T 9/00; G06T 3/40; G06T 9/005; G06T 7/12; G06T 15/005; G06T 3/00; G06T 5/00; G06T 15/00; H03M 7/6005; H03M 7/6011; H03M 7/3077; H03M 7/4031; H03M 7/425; H03M 7/6023; H03M 7/46; H04N 19/436; H04N 19/88; H04N 19/91; H04N 19/44; H04N 11/146; H04N 11/165; H04N 11/186; H04N 19/42; H04N 19/423; H04N 19/433; H04N 19/426; H04N 19/427; H04N 19/93; H04N 1/419; H04N 13/00
See application file for complete search history.

(56) References Cited

U.S. PATENT DOCUMENTS 6,442,212 B1 * 8/2002 Kratochwil ............. H04L 1/006
375/265
2015/0110175 A1 * 4/2015 Gokhale ............... H04N 19/117
375/240.03

FOREIGN PATENT DOCUMENTS

CN 107040794 A 8/2017
CN 107317987 A 11/2017
(Continued)

*Primary Examiner* — Duy M Dang

(57) ABSTRACT

A VR image compression transmission method and system are provided. A video image to be sent by a server is obtained and the video image is locally compressed according to a compression range to obtain a first compressed video image. Video encoding is performed on the first compressed video image to obtain a transmission video image, and then the transmission video image is transmitted to a client and video decoding is performed on the transmission video image to restore the transmission video image into a second compressed video image. The second compressed video image is decompressed to obtain a display video image.

20 Claims, 2 Drawing Sheets

(51) Int. Cl.
  *G06T 7/12* (2017.01)
  *G06T 15/00* (2011.01)
  *G06T 3/40* (2006.01)

(56) References Cited

FOREIGN PATENT DOCUMENTS

| | | |
|---|---|---|
| CN | 108322727 A | 7/2018 |
| CN | 108337497 A | 7/2018 |
| CN | 110572656 A | 12/2019 |
| CN | 112263214 A | 1/2021 |
| JP | 2003153263 A | 5/2003 |
| WO | 2017138994 A1 | 8/2017 |

\* cited by examiner

VR IMAGE COMPRESSION TRANSMISSION METHOD AND SYSTEM

CROSS REFERENCE

This application is a continuation application of PCT International Application No. PCT/CN2021/121005 filed on Sep. 27, 2021, which claims priority to Chinese Application No. 202110692510.X filed with China National Intellectual Property Administration on Jun. 22, 2021, the entirety of which is herein incorporated by reference.

TECHNICAL FIELD

The present disclosure relates to the field of virtual reality technology, and in particular, to a Virtual Reality (VR) image compression transmission method and system.

BACKGROUND

Due to the advancement of technology and the diversification of market demand, virtual reality systems are becoming increasingly common in many applications such as computer games, health and safety, industry and education and training. For example, mixed virtual reality systems are being integrated into mobile communication devices, game consoles, personal computers, movie theaters, theme parks, university laboratories, student classrooms, exercise and fitness rooms in hospitals, and other parts of life.

The core of VR streaming and VR live streaming is to encode the VR images obtained from a remote location and send the encoded VR images to the local area, where the received contents are unpacked, restructured, decoded and then displayed. Therefore, it is important to ensure the resolution of the images while reducing the traffic required for transmission. At present, mainly h264 and h265 encoding compression is used for videos. Although with good effect, there is a problem of low transmission efficiency due to large volume and high resolution of images, affecting the operation experience of VR live streaming or VR streaming.

Therefore, there is an urgent need for a VR image compression transmission method and system that reduces the image and video transmission volume and increases the video transmission rate.

SUMMARY

The embodiments of the present disclosure provide a VR image compression transmission method and system, which can solve the problem that low transmission efficiency due to large volume and high resolution of images affects the operation experience of VR live streaming or VR streaming, when h264 and h265 encoding compression with good effect is used for videos.

The embodiments of the present disclosure provide a VR image compression transmission method, which comprises:

obtaining a video image to be sent by a server and locally compressing the video image according to a compression range to obtain a first compressed video image, wherein the compression range is determined based on a transmission sample image;

performing video encoding on the first compressed video image to obtain a transmission video image;

transmitting the transmission video image to a client and performing video decoding on the transmission video image to restore the transmission video image into a second compressed video image; and decompressing the second compressed video image to obtain a display video image.

In some exemplary embodiments, a process of determining the compression range based on the transmission sample image comprises:

enabling, through a guidance program, both eyes of a user to respectively correspond to the left lens barrel and the right lens barrel of a VR headset;

capturing a sample image marked with at least one blind range area, sent by the server, through the left lens barrel and the right lens barrel; and adjusting a size of the sample image so that the at least one blind range area exits a field of view of the user.

In some exemplary embodiments, a process of locally compressing the video image according to a compression range to obtain a first compressed video image comprises:

performing area locking for the video image according to the compression range to divide the video image into an edge area and a center area;

performing a preset multiplier compression sampling for the edge area by a first image shader program to obtain a compressed edge area, and performing a true sampling for the center area to obtain a center restoration area; and using the compressed edge area and the center restoration area as the first compressed video image.

In some exemplary embodiments, the preset multiplier is 2 times.

In some exemplary embodiments, while performing video encoding on the first compressed video image to obtain a transmission video image, the method further comprises:

saving the video image and recording the compression range and a compression ratio of the first compressed video image in a customized information frame of the video image.

In some exemplary embodiments, the video encoding is h264 or h265 video encoding.

In some exemplary embodiments, the second compressed video has a same resolution as the first compressed video.

In some exemplary embodiments, a process of decompressing the second compressed video image to obtain a display video image comprises:

obtaining a compressed part and an original part of the second compressed video image, wherein the compressed part is identical to the compressed edge area, and the original part is identical to the center restoration area.

performing differential sampling for the compressed part by a second image shader program to restore the compressed part to a true edge area, and performing point-to-point sampling for the original part to obtain a true center area.

fitting the true edge area and the true center area to obtain the display video image.

The embodiments of the present disclosure also provide a VR image compression transmission system, which is configured to implement the VR image compression transmission method as previously described, and comprises:

an edge compression module, configured to obtain a video image to be sent by a server and locally compress the video image according to a compression range to obtain a first compressed video image, wherein the compression range is determined based on a transmission sample image;

a video encoding module, configured to perform video encoding on the first compressed video image to obtain a transmission video image;

a video decoding module, configured to transmit the transmission video image to a client and perform video decoding on the transmission video image to restore the transmission video image into a second compressed video image; and a video restoration module, configured to decompress the second compressed video image to obtain a display video image.

In some exemplary embodiments, the edge compression module comprises an image shader, wherein a first image shader program is provided in the image shader, and the first image shader program is configured to perform a preset multiplier compression sampling for an edge area divided according to the compression range to obtain a compressed edge area.

From the above technical solution, it can be seen that the embodiments of the present disclosure provide a VR image compression transmission method and system. A video image to be sent by a server is obtained and the video image is locally compressed according to a compression range to obtain a first compressed video image. Video encoding is performed on the first compressed video image to obtain a transmission video image, and then the transmission video image is transmitted to a client and video decoding is performed on the transmission video image to restore the transmission video image into a second compressed video image. The second compressed video image is decompressed to obtain a display video image. By using d3d or opengl computing as the medium, the image data within the compression range of the edge is compressed by an image shader program to reduce the overall image resolution by compressing the resolution of the edge of the video image, so as to reduce the image volume and improve the transmission rate, thus improving the stability of VR live streaming and VR streaming.

DETAILED DESCRIPTION OF THE EMBODIMENTS

At present, mainly h264 and h265 encoding compression is used for videos. Although with good effect, there is a problem of low transmission efficiency due to large volume and high resolution of images, affecting the operation experience of VR live streaming or VR streaming.

The embodiments of the present disclosure provide a VR image compression transmission method and system that can solve the above problem, the details of which is described in subsequent embodiments with drawings.

Figure 1:
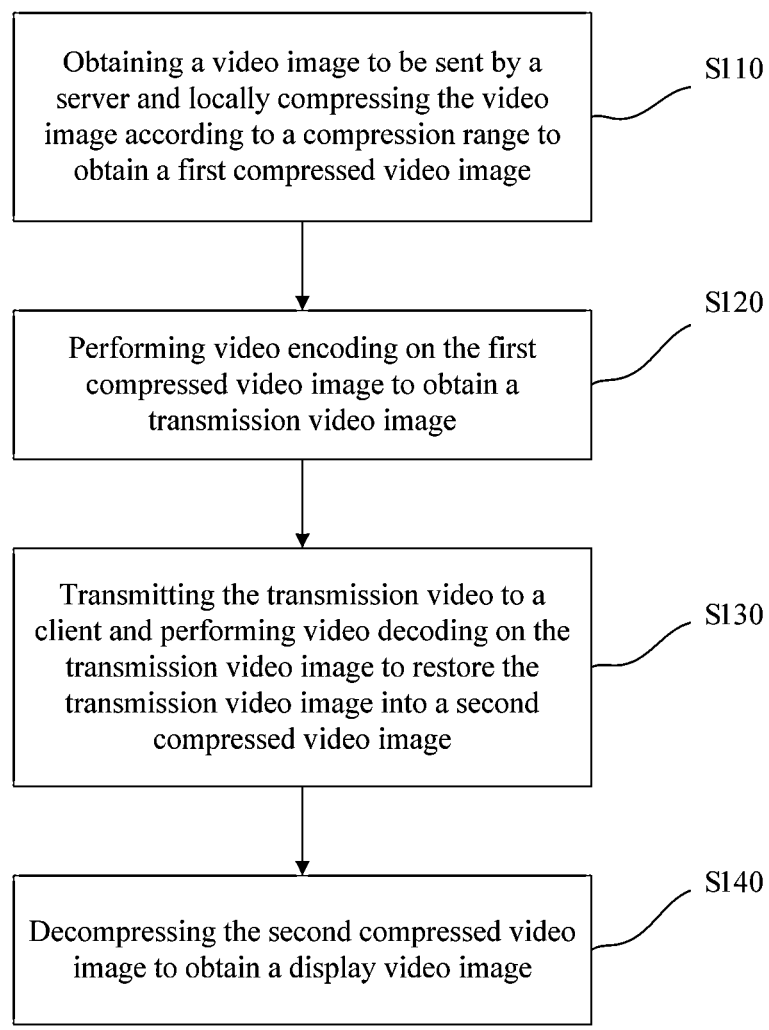
FIG. 1 is a schematic flowchart of a VR image compression transmission method according to the embodiments of the present disclosure.
Figure 3:
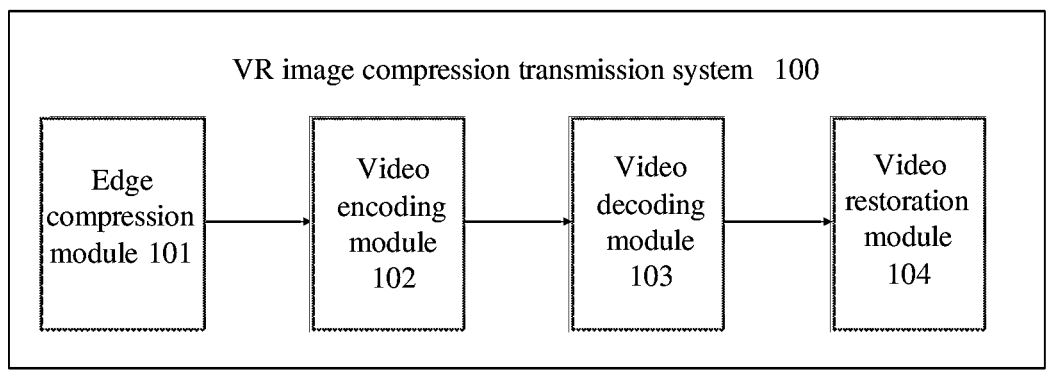
FIG. 3 is a schematic diagram of a VR image compression transmission system according to the embodiments of the present disclosure.

To illustrate the VR image compression transmission method and system provided in the embodiments of the present disclosure, FIG. 1 provides an exemplary illustration of a VR image compression transmission method according to the embodiments of the present disclosure. FIG. 3 provides an exemplary illustration of a VR image compression transmission system according to the embodiments of the present disclosure.

The description of the following exemplary embodiments is in fact merely illustrative and is in no way intended as any limitation on the present disclosure and the application or use of the present disclosure. Techniques and apparatus known to those having ordinary skill in the relevant field may not be discussed in detail, but where appropriate, the techniques and apparatus should be considered as part of the description.

As shown in FIG. 1, the embodiments of the present disclosure provide a VR image compression transmission method, comprising:

S1: obtaining a video image to be sent by a server and locally compressing the video image according to a compression range to obtain a first compressed video image, wherein the compression range is determined based on a transmission sample image;

S2: performing video encoding on the first compressed video image to obtain a transmission video image;

S3: transmitting the transmission video image to a client and performing video decoding on the transmission video image to restore the transmission video image into a second compressed video image; and S4: decompressing the second compressed video image to obtain a display video image.

As shown in FIG. 1, in operation S1, a video image to be sent by a server is obtained and the video image is locally compressed according to a compression range to obtain a first compressed video image, wherein the compression range is determined based on a transmission sample image. Herein, an operation S0 of determining the compression range based on the transmission sample image comprises:

S01: enabling, through a guidance program, both eyes of a user to respectively correspond to the left lens barrel and the right lens barrel of a VR headset.

S02: capturing a sample image marked with at least one blind range area, sent by the server, through the left lens barrel and the right lens barrel; and S03: adjusting a size of the sample image so that the at least one blind range area exits a field of view of the user.

A process of locally compressing the video image according to a compression range to obtain a first compressed video image comprises:

S11: performing area locking for the video image according to the compression range to divide the video image into an edge area and a center area;

S12: performing a preset multiplier compression sampling for the edge area by a first image shader program to obtain a compressed edge area, and performing a true sampling for the center area to obtain a center restoration area; and S13: using the compressed edge area and the center restoration area as the first compressed video image.

Figure 2:
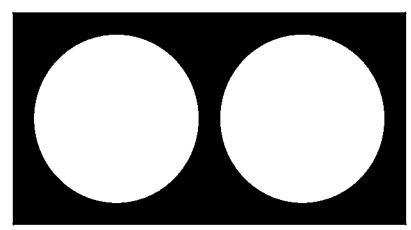
FIG. 2 is a schematic diagram of a compression range involved in the VR image compression transmission method according to the embodiments of the present disclosure.

In some exemplary implementations, as shown in FIG. 2, since the VR headset is designed to view a rectangular screen through near-circular left and right lens barrels, when the VR headset is worn normally, the edge of the rectangular screen is not visible (black part in the figure). The image of the edge part (black part) is visible only when the line of sight is shifted as far as possible or when the headset is moving sharply towards one side. In such a case, due to the abnormal line of sight or due to the rapid movement, it is difficult to view normally the display effect of the image of that part. Therefore, the overall image resolution can be reduced by compressing the resolution of the edge of the video image, thereby reducing the image volume. Therefore, the compression range is firstly determined by operation S0. In the embodiments, the video generator and sender is the server, and the VR headset is the client. After the server is connected to the client, the user is requested to wear the VR headset properly, with the guidance program of the client prompting the user to wear the headset normally, and to click the confirmation button of the VR headset after confirming that the headset has been worn properly via observation, so as to determine the left and right sides of the edge. Then, the server is preset with a left position and a right position. For example, for a video image with a resolution of 1920, it is preset that the positions of 480 and 1440 (1920−480=1440) are the left position and the right position respectively, and that the parts corresponding to 0-480 and 1440-1920 are rendered into solid red, and the other parts of the video image remain unchanged. The image is transmitted to the client for display and an original image resolution is recorded. At this point, the client prompts the user to click the button "+" or "−" to increase or decrease the size of the red area, and click a confirmation button when the red area is only a little visible or invisible and does not affect the overall image perception. The client sends the command "+" or "−" to the server, and the server adjusts the starting boundary of the red part according to the command until the user clicks the confirmation button, and records the left and right compression boundaries. For the upper and lower boundaries, the same process is repeated for confirmation, thereby obtaining the compressing range. That is, the red area finally confirmed in the embodiments is the compressing range. Subsequently, such compression range is used to locally compress the video image to be sent by the server to obtain a first compressed video image.

Furthermore, in the embodiments, the preset multiplier in operation S1 is 2 times. As an exemplary implementation of the embodiments, after the compression range is determined, a first image shader program of the image shader is written. In the embodiments, the first image shader program is a shader program which reconstructs the image via sampling. Taking a video image with a resolution of 1920*1920 as an example, assuming the left, right, top, and bottom compression boundaries are 480, when 2 times compression is adopted, the horizontal 0-480 part is the edge area, in which sampling is performed once every 2 pixels, where odd numbered points are sampled in the odd numbered rows, and even numbered points are sampled in the even numbered rows; and 480-1440 part is the center area, in which sampling is performed once every 1 pixel, i.e., true sampling is adopted. The first compressed video image formed after compression is reconstructed as a video image of 1440*1440, with the compressed left, right, top, and bottom edge area of 240, respectively, and the center area of 960 in the center uncompressed part. After processing, the first compressed video image becomes 0.5625 times of the original video image, and the volume is reduced significantly.

In the embodiment as shown in FIG. 1, while perform the operation S2 of performing video encoding on the first compressed video image to obtain a transmission video image, the method further comprises:

saving the video image and recording the compression range and a compression ratio of the first compressed video image in a customized information frame of the video image.

As an exemplary implementation, in the process of transmitting the first compressed video image formed in operation S1 to the client, it is needed to perform video encoding on the first compressed video image. In the embodiments, the video encoding is designed as h264 or h265 video encoding. If video encoding is performed for the first compressed video image to obtain, for example, a h264 or h265 video, both the boundary information (i.e., the compression range) and the compression ratio are recorded in the SEI (customized information) frame to facilitate the restoration of the video image at a later stage. Also, if the original image is saved, the boundary information and the compression ratio may be recorded in the same folder, or may be named according to a following rule when generating the beginning of a bitmap name: the original resolution_left and right boundary_left and right compression ratio_top and bottom boundary_top and bottom compression ratio. For example, the name may be 1920#1920_480_2_480_2_customized name.bmp.

As shown in FIG. 1, in operation S3, the transmission video image is transmitted to a client and video decoding is performed on the transmission video image to restore the transmission video image into a second compressed video image, i.e., after performing video encoding on the first compressed video image with the edge area compressed and transmitting the video image to the client, video decoding is required to obtain the decoded second compressed video image. In the embodiments, the decoded second compressed video image is identical to the first compressed video image before video encoding, i.e., the second compressed video has a same resolution as the first compressed video to prevent video distortion.

As shown in FIG. 1, in operation S4, the second compressed video image is decompressed to obtain a display video image. The operation that the second compressed video image is decompressed to obtain a display video image comprises:

S41: obtaining a compressed part and an original part of the second compressed video image, wherein the compressed part is identical to the compressed edge area, and the original part is identical to the center restoration area;

S42: performing differential sampling for the compressed part by a second image shader program to restore the compressed part to a true edge area, and performing point-to-point sampling for the original part to obtain a true center area; and S43: fitting the true edge area and the true center area to obtain the display video image.

In operation S4, the second compressed video image (equivalent to the first compressed video image) with the edge compressed is decompressed. In some exemplary implementations, in the real-time streaming or real-time live streaming, the boundary information (compression range) and the original image resolution has been recorded. For a stored decompressed file, such information can be extracted from the video stream SEI frame or from the image name. A second image shader program in the image shader needs to be written in order to achieve the decompression. In the embodiments, the second image shader program is a shader program which reconstructs the image via sampling. That is, for the compressed part, the pigmentation of the two points is extended based on the original image using difference sampling, i.e., the sampler is configured to perform difference sampling to restore the compressed part to the original size. For the original part (the uncompressed part of the image), the sampler is configured to perform point-to-point sampling. Both the first image shader program, which performs compression, and the second image shader program, which performs decompression, use opengl or d3d technology as the medium for invoking the shader program, thus ensuring the speed of operation.

Moreover, it should be noted that in the process of real-time streaming or live streaming, the user can adjust the size of the compression range (boundary information) at any time, and then the localized compression operation and the decompression operation for the localized compression are performed are performed are performed according to the compression range according to operations S1 to S4, so that the transmission video image is transmitted at a small resolution, improving the transmission rate and does not affect the image quality and resolution of the video image, and ensuring the quality and stability of real-time streaming or live streaming.

As described above, the embodiments of the present disclosure provide a VR image compression transmission method. A video image to be sent by a server is obtained and the video image is locally compressed according to a compression range to obtain a first compressed video image. Video encoding is performed on the first compressed video image to obtain a transmission video image, and then the transmission video image is transmitted to a client and video decoding is performed on the transmission video image to restore the transmission video image into a second compressed video image. The second compressed video image is decompressed to obtain a display video image. By using d3d or opengl computing as the medium, the image data within the compression range of the edge is compressed by an image shader program to reduce the overall image resolution by compressing the resolution of the edge of the video image, so as to reduce the image volume and improve the transmission rate, thus improving the stability of VR live streaming and VR streaming.

As shown in FIG. 3, the embodiments of the present disclosure also provide a VR image compression transmission system 100, which is configured to implement the VR image compression transmission method as previously described, and comprises:

an edge compression module 101, configured to obtain a video image to be sent by a server and locally compress the video image according to a compression range to obtain a first compressed video image, wherein the compression range is determined based on a transmission sample image;

a video encoding module 102, configured to perform video encoding on the first compressed video image to obtain a transmission video image;

a video decoding module 103, configured to transmit the transmission video image to a client and perform video decoding on the transmission video image to restore the transmission video image into a second compressed video image; and a video restoration module 104, configured to decompress the second compressed video image to obtain a display video image.

The edge compression module 101 comprises an image shader.

A first image shader program is provided in the image shader, and the first image shader program is configured to perform a preset multiplier compression sampling for an edge area divided according to the compression range to obtain a compressed edge area.

An image shader is also comprised in the video restoration module 104, i.e., the video restoration module also comprises an image shader. The image shader also comprises a second image shader program. The second image shader program is configured to perform differential sampling for the compressed part of the second compressed video image to restore the compressed part to a true edge area, and perform point-to-point sampling for the original part of the second compressed video image to obtain a true center area, thereby obtaining a display video image. In this way, the video image sent by the server is fully restored for display, thereby improving the transmission rate without affecting the stability of the video image.

As can be seen by the above implementation, the embodiments of the present disclosure provide a VR image compression transmission system. the edge compression module 101 firstly obtains a video image sent by the server, and locally compresses the video image according to a compression range to obtain a first compressed video image, and then the video encoding module 102 performs video encoding on the first compressed video image to obtain a transmission video image, and then transmits the transmission video image to a client; the video decoding module 103 performs video decoding on the transmission video image to restore the transmission video image into a second compressed video image, and then the video restoration module 104 decompresses the second compressed video image to obtain a display video image. By using d3d or opengl computing as the medium, the image data within the compression range of the edge is compressed by an image shader program to reduce the overall image resolution by compressing the resolution of the edge of the video image, so as to reduce the image volume and improve the transmission rate, thus improving the stability of VR live streaming and VR streaming.

The VR image compression transmission method and system provided in the embodiments of the present disclosure are described by way of example with reference to the accompanying drawings. However, it should be understood by the person having ordinary skill in the art that various improvements can be made to the above VR image compression transmission method and system proposed in the embodiments of the present disclosure without departing from the content of the embodiments of the present disclosure. Therefore, the scope of protection of the present disclosure should be determined by the content of the attached claims.

Specific examples in the embodiments may be made with reference to the examples described in the above embodiments and exemplary implementations. This embodiment will not be repeated herein.

Apparently, it should be understood by the person having ordinary skill in the art that the modules or operations of the embodiments of the present disclosure described above may be implemented with a generic computing device. They may be centralized on a single computing device, or distributed on a network of multiple computing devices. Or, they may be implemented with program code executable by the computing device. Therefore, they may be stored in a storage device to be executed by the computing device. In some cases, the operations shown or described may be executed in a different order than herein, or they may be implemented separately as individual integrated circuit modules, or multiple modules or operations thereof may be implemented as individual integrated circuit modules. In this way, the present disclosure is not limited to any particular combination of hardware and software.

The foregoing are only exemplary embodiments of the present disclosure, and are not used to limit the present disclosure, which is subject to various changes and variations for the person having ordinary skill in the art. Any modification, equivalent replacement, improvement, etc. made within the principles of the present disclosure should be comprised within the scope of protection of the present disclosure.

INDUSTRIAL APPLICABILITY

As described above, the embodiments of the present disclosure provides a VR image compression transmission method, with the beneficial effects of reducing the overall image resolution by compressing the resolution of the edge of the video image, so as to reduce the image volume and improve the transmission rate, thus improving the stability of VR live streaming and VR streaming.

What is claimed is:

1. An image processing method performed by a server, comprising:
    obtaining a video image to be sent by the server;
    locally compressing the video image according to a compression range to obtain a first compressed video image, wherein the compression range is determined in advance by sending a transmission sample image from the server to a client and receiving feedback from the client;
    performing video encoding on the first compressed video image to obtain a transmission video image; and
    transmitting the transmission video image to the client.

2. The image processing method according to claim 1, wherein a process of determining the compression range comprises the following operations performed at the server:
    sending the transmission sample image to the client for display;
    receiving an adjustment command, input by a user on the client, for the transmission sample image; and
    determining the compression range according to the adjustment command.

3. The image processing method according to claim 2, wherein locally compressing the video image according to a compression range to obtain a first compressed video image comprises:
    dividing the video image into an edge area and a center area according to the compression range;
    performing a preset multiplier compression sampling for the edge area by a first image shader program to obtain a compressed edge area, and performing a true sampling for the center area to obtain a center restoration area; and
    using the compressed edge area and the center restoration area as the first compressed video image.

4. The image processing method according to claim 3, wherein
    the preset multiplier is 2 times.

5. The image processing method according to claim 3, wherein while performing video encoding on the first compressed video image to obtain a transmission video image, the method further comprises:
    saving the video image and recording the compression range and a compression ratio of the first compressed video image in a customized information frame of the video image.

6. The image processing method according to claim 5, wherein the video encoding is h264 or h265 video encoding.

7. A non-transitory computer readable storage medium, wherein the computer readable storage medium stores a computer program, and the computer program, when executed by a processor, implements the method according to claim 1.

8. An electronic device, comprising a memory and a processor, where a computer program is stored in the memory, and the processor is configured to run the computer program to perform the method according to claim 1.

9. The image processing method according to claim 3, wherein
    the first image shader program uses an opengl or d3d technology as a medium for invoking the first image shader program.

10. An image processing method performed by a client, comprising:
    receiving a transmission video image from a server, wherein the transmission video image is obtained by first locally compressing a video image to be sent by the server, according to a compression range to obtain a first compressed video image and then performing video encoding on the first compressed video image, wherein the compression range is determined in advance by sending a transmission sample image from the server to the client and receiving feedback from the client;
    performing video decoding on the transmission video image to restore the transmission video image into a second compressed video image; and
    decompressing the second compressed video image to obtain a display video image.

11. The image processing method according to claim 10, wherein a process of determining the compression range comprises the following operations performed at the client:
    enabling, through a guidance program, both eyes of a user to respectively correspond to the left lens barrel and the right lens barrel of the client;
    capturing the transmission sample image marked with at least one blind range area, sent by the server, through the left lens barrel and the right lens barrel;
    receiving an adjustment command which is input by the user to adjust a size of the transmission sample image so that the at least one blind range area exits a field of view of the user; and
    sending the adjustment command to the server, wherein the adjustment command is used for determining the compression range.

12. The image processing method according to claim 10, wherein the second compressed video has a same resolution as the first compressed video.

13. The image processing method according to claim 12, wherein decompressing the second compressed video image to obtain a display video image comprises:
    obtaining a compressed part and an original part of the second compressed video image, wherein the compressed part is identical to the compressed edge area, and the original part is identical to the center restoration area;
    performing differential sampling for the compressed part by a second image shader program to restore the compressed part to a true edge area, and performing point-to-point sampling for the original part to obtain a true center area; and
    fitting the true edge area and the true center area to obtain the display video image.

14. The image processing method according to claim 13, wherein
    the second image shader program uses an opengl or d3d technology as a medium for invoking the second image shader program.

15. A non-transitory computer readable storage medium, wherein the computer readable storage medium stores a computer program, and the computer program, when executed by a processor, implements the method according to claim 10.

16. An electronic device, comprising a memory and a processor, where a computer program is stored in the memory, and the processor is configured to run the computer program to perform the method according to claim 10.

17. An image processing system, comprising a server and a client, wherein the server is configured to obtain a video image to be sent by the server and locally compress the video image according to a compression range to obtain a first compressed video image, wherein the compression range is determined in advance by sending a transmission sample image from the server to the client and receiving feedback from the client; perform video encoding on the first compressed video image to obtain a transmission video image; and transmit the transmission video image to the client; and the client is configured to receive the transmission video image from the server; perform video decoding on the transmission video image to restore the transmission video image into a second compressed video image; and decompress the second compressed video image to obtain a display video image.

18. The image processing system according to claim 17, wherein the server is configured to perform a preset multiplier compression sampling for an edge area divided according to the compression range to obtain a compressed edge area.

19. The image processing system according to claim 17, wherein the client is configured to perform differential sampling for a compressed part of the second compressed video image to restore the compressed part to a true edge area, and perform point-to-point sampling for an original part of the second compressed video image to obtain a true center area, thereby obtaining a display video image.

20. The image processing system according to claim 17, wherein the server is configured to:
send the transmission sample image to the client for display;
receive an adjustment command, input by a user on the client, for the transmission sample image; and
determine the compression range according to the adjustment command; and the client is configured to:
enable, through a guidance program, both eyes of a user to respectively correspond to the left lens barrel and the right lens barrel of the client;
capture the transmission sample image marked with at least one blind range area, sent by the server, through the left lens barrel and the right lens barrel;
receive an adjustment command which is input by the user to adjust a size of the transmission sample image so that the at least one blind range area exits a field of view of the user; and
send the adjustment command to the server.

* * * * *